United States Patent [19]

Yoshinaka

[11] Patent Number: 4,811,123
[45] Date of Patent: Mar. 7, 1989

[54] APPARATUS FOR REPRODUCING DIGITAL DATA

[75] Inventor: Tadaaki Yoshinaka, Kanagawa, Japan

[73] Assignee: Sony Corporation, Tokyo, Japan

[21] Appl. No.: 51,365

[22] Filed: May 19, 1987

[30] Foreign Application Priority Data

May 20, 1986 [JP] Japan .................................. 61-115417

[51] Int. Cl.⁴ ........................ G11B 5/62; G11B 15/12
[52] U.S. Cl. ....................................... 360/26; 360/64
[58] Field of Search ....................... 360/26, 27, 75, 64

[56] References Cited

U.S. PATENT DOCUMENTS 4,636,875 1/1987 Scholz .................... 360/27

Primary Examiner—Vincent P. Canney
Attorney, Agent, or Firm—Lewis H. Eslinger; Jay H. Maioli

[57] ABSTRACT

In a digital video tape recorder designed for recording each unit of video data in a plurality of tracks simultaneously by the use of a plurality of magnetic heads, the shift value between a track scanned by a magnetic head in a reproducing mode and another track recorded previously by the same magnetic head is decided from the majority of shift values obtained with respect to the individual magnetic heads, and the contents of identifying signals included in the pickup data are determined in accordance with the majority-decided shift value, whereby accurate shift values and identifying signals are ensured to consequently realize satisfactory picture reproduction.

3 Claims, 3 Drawing Sheets

APPARATUS FOR REPRODUCING DIGITAL DATA

BACKGROUND OF THE INVENTION

1. Field of the Invention

The present invention relates to an apparatus for reproducing digital data, such as a digital video tape recorder (digital VTR).

2. Description of the Prior Art

Since the amount of information to be recorded is great in a digital VTR, four magnetic heads, for example, are disposed on a drum at an axial interval corresponding to a track pitch individually, and four recording tracks are formed on a magnetic tape per rotation of the drum.

The video data of one field is divided into four channels, and the divided data of the individual channels are recorded with two rotations of the drum. With regard to tracks recorded on the magnetic tape, the data segment of each track is divided into a plurality of blocks, and there are added to each block a synchronizing signal, identifying signals representative of an even or odd field, a segment number and a recording head, and a block address. However, an identifying signal of the same content appears at every 16 tracks, for example. Accordingly, when writing the data in a video memory incorporated in each channel data processing circuit, it becomes necessary to accurately detect and recognize the state of the identifying signal for achieving exact recovery of the data.

However, there may occur a phenomenon that a magnetic head of one channel picks up the data from the track recorded by a magnetic head of another channel, and such phenomenon is unavoidable particularly in a varied-speed reproduction mode with occurrence of continuous positional deviation.

As a result, there also exists a case where the data not corresponding to a certain channel is written in the video memory incorporated in the channel data processing circuit of that channel and consequently the desired video data fails to be reproduced.

Regarding this problem, there may be contrived a technique of first detecting the positional deviation of a magnetic head from a recorded track (difference between one track relative to a magnetic head and another track being scanned by the same magnetic head; hereinafter referred to as shift value) in accordance with the identifying signal, then switching the channels of the input data and writing the data in the predetermined video memory.

However, in a varied-speed reproduction mode where each magnetic head executes its scanning while traversing the adjacent tracks, the envelope level of the pickup signal may be lowered to cause a problem that the identifying signal cannot be read out with accuracy. Accordingly, it becomes impossible to achieve precise detection of the shift value, hence failing in solution of the problem with regard to attaining satisfactory video data reproducibility.

OBJECTS AND SUMMARY OF THE INVENTION

Therefore an object of the present invention resides in providing an improved digital data reproducing apparatus which eliminates the drawbacks mentioned above.

And another object of the invention is to provide an improved digital data reproducing apparatus which is capable of exactly recognizing the data state when processing the data in each channel data processing circuit and thereby outputting satisfactory data with high reproducibility.

According to one aspect of the present invention, there is provided an apparatus for reproducing digital data one unit of which is divided into a plurality of channels, supplemented with at least one kind of identifying data and recorded on a plurality of tracks of a tape recording medium. The apparatus comprises a plurality of reproducing heads corresponding to the tracks for reproducing digital data from the recording medium; means for detecting the identifying data added to the reproduced digital data on respective reproduced tracks; means for detecting respective relationships between the reproducing heads and the tracks reproduced by the reproducing heads in the respective channels; means for determining an optimum relationship from the said relationships; and means for determining further identifying data based on the optimum relationship and for supplying the further identifying data to the respective channels.

DETAILED DESCRIPTION OF THE PREFERRED EMBODIMENT

Hereinafter an exemplary embodiment of the present invention will be described with reference to the accompanying drawings.

Figure 1:
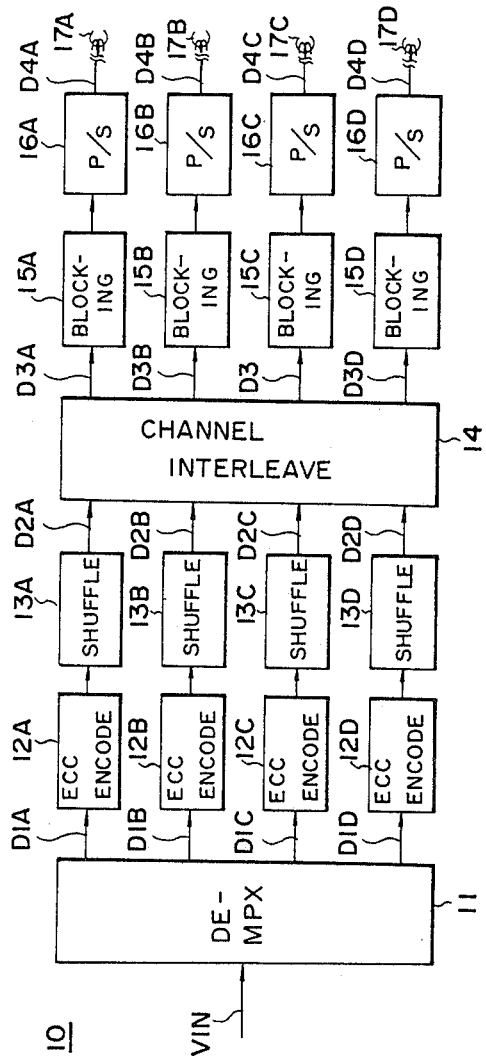
FIG. 1 is a block diagram of a recording system in a digital VTR to which the present invention is applied.
Figure 2:
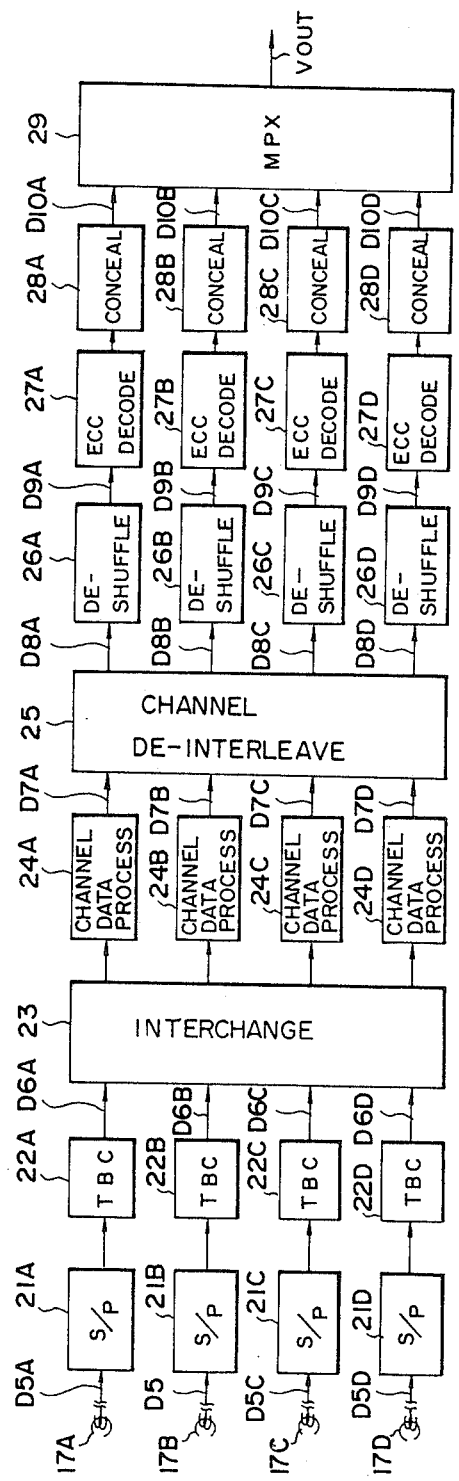
FIG. 2 is a block diagram of a reproducing system in the digital VTR of FIG. 1 to which the invention is applied.

In a digital video tape recorder to which the present invention is applied, as shown in FIG. 1, input video data VIN processed a recording system 10 is fed to magnetic heads 17A–17D, and the data picked up by such magnetic heads 17A–17D are processed in a reproducing system 20 of FIG. 2 to obtain the original video data VOUT.

First in the recording system 10, the video data VIN of one field is divided by a demultiplexer 11 into data D1D, D1B, D1C, D1D of four channels A, B, C, D, which are then fed to error detection-correction code encoders 12A–12D where an error detection-correction code is encoded for each channel. Subsequently the data are fed to corresponding shuffling circuits 13A–13D respectively and are thereby rearranged (shuffled) so as to be in condition for interpolation upon occurrence of any data dropout. And the shuffled data D2A–D2D of the individual channels are fed to a channel interleaver 14.

The channel interleaver 14 mutually mixes (interleaves) the data D2A–D2D to form new data D3A–D3D of four channels A–D and feeds such data to corresponding blocking circuits 15A–15D respectively.

Figure 3:
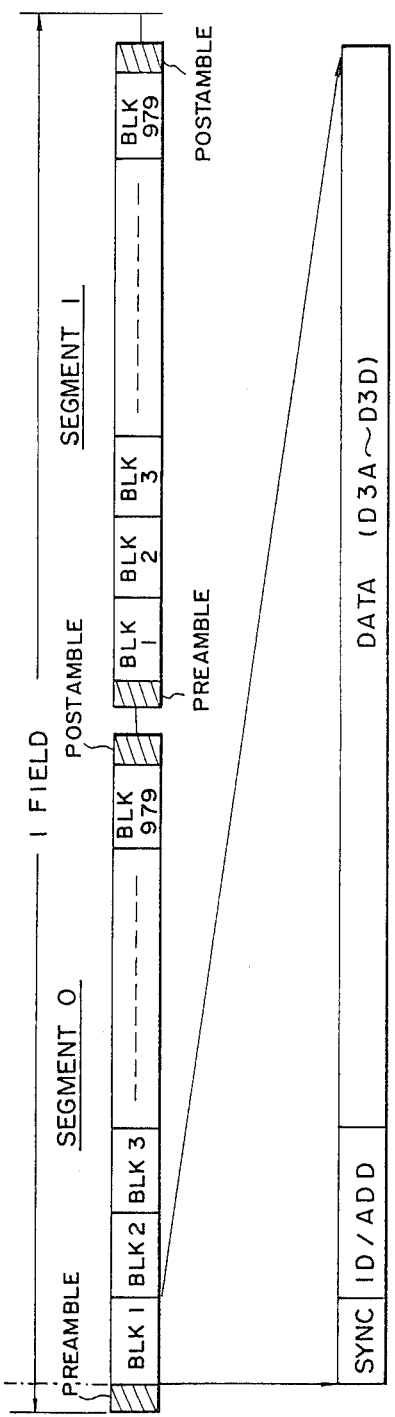
FIG. 3 schematically illustrates a format of recorded data obtained in the digital VTR of FIG. 1.
Figure 4:
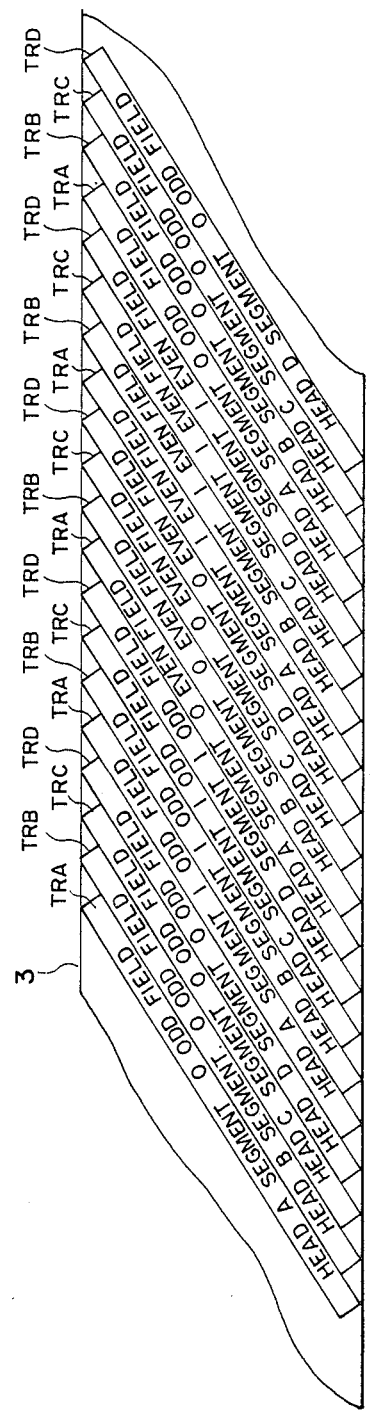
FIG. 4 schematically illustrates a recorded tape format inclusive of the relationship between tracks and identifying signals in the digital VTR of FIG. 1.

The blocking circuits 15A–15D halve the data D3A–D3D, which are inputted thereto during a time of one field, to data components (hereinafter referred to as segments) each to be recorded in one track as shown in FIG. 3, and further divide the data of each segment into, for example, 979 blocks BLK1–BLK979. Subsequently, for each of the blocks BLK1–BLK979, there are added a synchronizing signal SYNC, identifying signals ID representative of a recording magnetic head, an odd or even number of the field, 0 or 1 of the segment ("0" and "1" denote a first segment and a second segment, respectively), and an address ADD of the block. The detailed relationship thereof to the tracks is shown in FIG. 4. A preamble PRE and a postamble POS representing segment regions are further added to each of the segments SEG0 and SEG1 in the blocking circuits 15A–15D, and then such segments are fed to parallel/serial converters 16A–16D so as to be converted into serial data D4A–D4D.

After being modulated, the serial data D4A–D4D are fed to corresponding magnetic heads 17A–17B respectively and are thereby recorded on the magnetic tape 3.

The magnetic heads, although not shown, are formed as mentioned in the preceding background of the invention.

Meanwhile in the reproducing system 20, as shown in FIG. 2, the signals picked up by the magnetic heads 17A–17D are demodulated to serial data D5A–D5D and then are fed to serial/parallel converters 21A–21D corresponding respectively to the magnetic heads 17A–17D. The parallel data D6A–D6D thus obtained are fed to an interchanger 23 after the time base fluctuation of the data are absorbed in time base correctors (TBC) 22A–22D.

The interchanger 23 extracts identifying signals ID of the input parallel data D6A–D6D, then detects the channel deviations and writes the data of blocks BLK1–BLK979 (FIG. 3) in video memories incorporated in the channel data processing circuits 24A–24D. Data D7A–D7D read out from the channel data processing circuits 24A–24D with removal of the synchronizing signals SYNC, identifying signals ID and addresses ADD are processed in a channel deinterleaver 25 in a reverse manner relative to the procedure of the channel interleaver 14 and, after conversion into channel data D8A–D8D of original channels, such data are fed to corresponding deshuffling circuits 26A–26D respectively.

The deshuffling circuits 26A–26D execute a reverse procedure in comparison with the shuffling circuits 13A–13D to produce rearranged data D9A–D9D, which are then fed to corresponding error correction circuits 27A–27D where any errors are corrected according to the error detection-correction code. In case proper correction is impossible due to excessive errors, some adjustment such as interpolation from peripheral pixel data is performed in concealment circuits 28A–28D. And subsequently a multiplexer 29 combines the data D10A–D10D of individual channels with one another to provide reproduction digital video data VOUT.

Now a detailed description will be given of the interchanger 23 and the channel data processors which are principal components of the reproducing apparatus according to the present invention.

Figure 5:
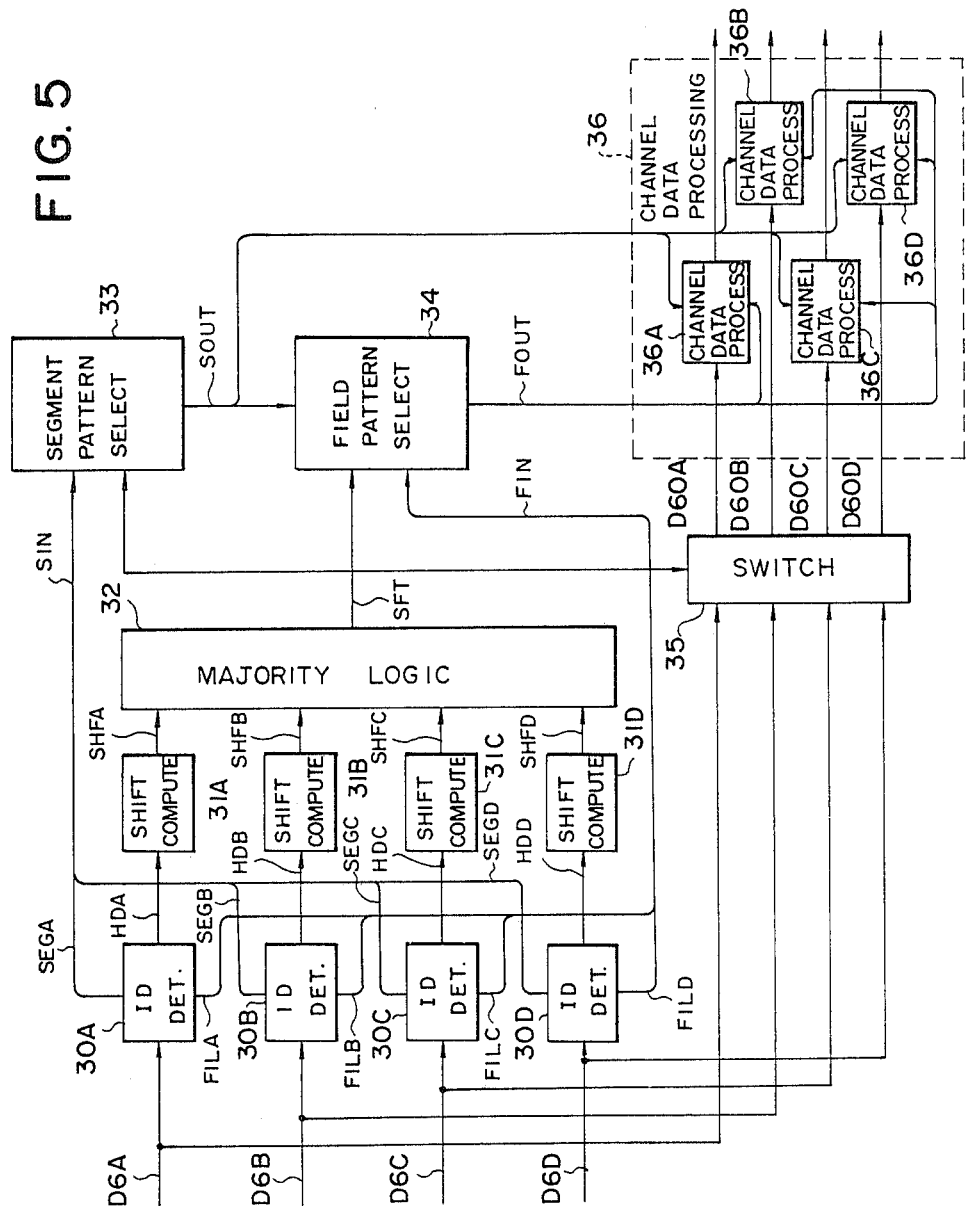
FIG. 5 is a block diagram showing principal components in an exemplary embodiment of digital video data reproducing apparatus of the invention.

In FIG. 5, pickup data D6A–D6D of channels A–D after removal of time base fluctuation in time base correctors 22A–22D (shown in FIG. 2) are fed to corresponding identifying signal detection circuits 30A–30D.

The identifying signal detection circuits 30A–30D detect identifying signals ID (FIG. 3) recorded at the beginnings of blocks of data D6A–D6D, then separate therefrom head identifying signals HDA–HDD for the magnetic heads used for recording the data D6A–D6D, and feed the separated signals HDA–HDD respectively to shift computing circuits 31A–31D composed of ROMs.

The shift computing circuits 31A–31D function in response to the head identifying signals HDA–HDD inputted thereto and compute shift value signals SHFA–SHFD representing the positional deviation of the tracks, which are being scanned for pickup by the magnetic heads of the individual channels, from the tracks recorded previously by the magnetic heads of the same channels. For example, when the head 2A is scanning the track TRC (corresponding to head identifying signal HDC) recorded by the head 2C as shown in FIG. 4, the track TRC positionally deviates by two track pitches from the track TRA recorded by the head 2A, so that the shift computing circuit 31A produces an output shift value signal SHFA having content of "2".

The shift value signals SHFA–SHFD thus obtained are then fed to a majority logic circuit 32 composed of ROMs. This circuit 32 regards the majority of the shift values, which are represented by the shift value signals SHFA–SHFD respectively, as a shift value relative to the individual magnetic heads 17A–17D and feeds such majority-decided shift value signal SFT to a segment pattern selector 33, a field pattern selector 34 and a switch circuit 35.

Since the magnetic heads 17A–17D are disposed on a drum 1 with a positional difference of one track pitch individually, each magnetic head essentially has the same shift value in such a manner that, when the head 17A is scanning the track TRC for example., the other heads 17B, 17C, 17D scan tracks TRD, TRA, TRB respectively.

However, in a varied-speed reproduction mode where the heads 17A–17D perform scanning while traversing adjacent tracks, complete pickup of identifying signals ID is not executed exactly and there may occur an undesired phenomenon that the shift value signals SHFA–SHFD outputted from the shift computing circuits 31A–31D become mutually different. This embodiment, therefore, is so contrived that the majority of such shift value signals SHFA–SHFD is chosen by the logic circuit 32 to achieve accurate detection of the shift value.

The identifying signal detection circuits 30A–30D separate segment identifying signals SEGA–SEGD from the data identifying signals ID (FIG. 3) for data D6A–D6D and feed the separated signals to the segment pattern selector 33, which then determines segment identifying signals relative to the data D6A–D6D of the individual channels in accordance with the majority-decided shift value signal SFT and the segment identifying signals SIN (SEGA–SEGD) inputted thereto.

When the shift value is "2" for example, firstly there may arise a case where the magnetic heads 17A and 17B scan the recorded tracks TRC and TRD with the first rotation of one field while the magnetic heads 17C and 17D scan the recorded tracks TRA and TRB with the second rotation of one field. In this case, the contents of segment identifying signals SEGA-SEGD assume a first pattern (SPAT1) of "0011" as shown in Table 1.

TABLE 1

|        | SEG A | SEG B | SEG C | SEG D |
|--------|-------|-------|-------|-------|
| SPAT 1 | 0     | 0     | 1     | 1     |
| SPAT 2 | 1     | 1     | 0     | 0     |

Patterns of segment identifying signals

Secondly, when the shift value is "2", there may arise another case where the magnetic heads 17A and 17B scan the recorded tracks TRC and TRD with the second rotation of one field while the magnetic heads 17C and 17D scan the recorded tracks TRA and TRB with the first rotation of one field. In this case, the contents of segment identifying signals SEGA-SEGD assume a second pattern (SPAT2) of "1100" as shown in Table 1.

The segment pattern selector 33 judges that the contents of the segment identifying signals SEGA-SEGD inputted from the identifying signal detection circuits 30A-30D are coincident with or approximate to one of the two patterns SPAT1 and SPAT2 of the segment identifying signals SEGA-SEGD determined by the majority-decided shift value signal SFT, and defines the content of the selected pattern as an output segment identifying signal SOUT (SEGA-SEGD). For example, when the shift value is "2" and the content of the input segment identifying signals SEGA-SEGD is "1011" which is appproximate to the first pattern SPAT1 shown in Table 1, the segment pattern selector 33 sends an output signal SOUT having the content "0011" of the first pattern SPAT1.

A field pattern selector 34 receives, in addition to the segment identifying signal SOUT and the aforementioned majority-decided shift value signal SFT, a field identifying signal FIN (FILA-FILD) separated from the data identifying signal ID relative to the data D6A-D6D in the identifying signal detection circuits 30A-30D. When the magnetic heads 17A-17D are scanning the tracks with a shift value of "2" for example, there are four possible combination patterns of field identifying signals FILA-FILD as shown in Table 2.

TABLE 2

|           | FIL A | FIL B | FIL C | FIL D |
|-----------|-------|-------|-------|-------|
| Pattern 1 | odd   | odd   | odd   | odd   |
| Pattern 2 | odd   | odd   | even  | even  |
| Pattern 3 | even  | even  | even  | even  |
| Pattern 4 | even  | even  | odd   | odd   |

Patterns of field identifying signals

However, once the pattern relative to the segment identifying signals SEGA-SEGD is determined, the patterns of the field identifying signals FILA-FILD are reduced to two as is obvious from the contents of tracks shown in FIG. 4.

For example, when the shift value is "2" and the first pattern SPAT1 shown in Table 1 is selected as the contents of segment identifying signals SEGA-SEGD, the contents of field identifying signals FILA-FILD essentially assume either a second pattern of "odd-odd-even-even" or a fourth pattern of "even-even-odd-odd". When the contents of the field identifying signal FIN received from the identifying signal detection circuits 30A-30D have a pattern of "even-even-odd-even" for example, the field pattern selector 34 selects the second pattern of "even-even-odd-odd" which is more approximate thereto in comparison with the fourth pattern.

The output signal SOUT of the segment pattern selector 33 and the output signal FOUT of the field pattern selector 34 are fed to a channel data processor 36, which also receives pickup data D6A-D6D (D60A-D60D) through a switch circuit 35.

The switch circuit 35 functions in response to the majority-decided shift value signal SFT and serves to selectively feed pickup data D6A-D6D to channel data processing circuits 36A-36D of the same channels as those of the magnetic heads in a recording operation. When the shift value is "2" for example, the switch circuit 35 selectively feeds the data D6A, which is obtained from the channel-A magnetic head 17A, to the channel-C data processing circuit 36C. And similarly the switch circuit 35 feeds the data D6B, D6C, D6D from the magnetic heads 17B, 17C, 17D of channels B, C, D to the channel data processing circuits 36D, 36A, 36B of channels D, A, B respectively.

The channel data processing circuits 36A-36D are equipped with picture memories so as to store the data of the regions DATA (FIG. 3) out of the received data D60A-D60D in prescribed areas of the memories which are specified by the addresses ADD included in the data D60A-D60D, and also by the segment identifying signal SOUT fed from the segment pattern selector 33 and the field identifier signal FOUT fed from the field pattern selector 34. Then the circuits 36A-36D sequentially read out the stored data and provide merely the signals D3A-D3D of the data regions DATA (FIG. 3).

When a varied-speed reproduction mode is selected in the constitution described above and a reproducing operation is performed at a varied speed, the magnetic heads 17A-17D scan the tracks across the tape while traversing the adjacent tracks.

Supposing now that the magnetic head 17A is scanning the track TRC in a segment "0" of an "odd" field, then the magnetic heads 17B, 17C, 17D scan the tracks TRD, TRA, TRB respectively. The data D6A-D6D picked up by such scanning are fed to the identifying signal detection circuits 30A-30D, where segment identifying signals SEGA-SEGD, head identifying signals HDA-HDD and field identifying signals FILA-FILD are separated from the data. The signals thus separated are fed respectively to the segment pattern selector 33, the shift value computing circuits 31A-31D and the field pattern selector 34.

The shift value signals SHFA-SHFD formed in the shift computing circuits 31A-31D on the basis of the head identifying signals HDA-HDD essentially have contents of "2", so that the majority thereof retain "2" despite the presence of some noise or the like, and consequently a majority-decided shift value signal SFT having content of "2" is outputted from the majority logic circuit 32 and is fed to the segment pattern selector 33, the field pattern selector 34 and the switch circuit 35.

In the segment pattern selector 33, the segment identifying signal SIN inputted thereto is judged to be coincident with or approximate to one of the patterns determined by the majority-decided shift value signal, and a segment identifying signal SOUT having such coincident or approximate pattern (in this example, the first pattern SPAT1 with an extremely high probability) is outputted from the segment pattern selector 33 to both the field pattern selector 34 and the channel data processor 36.

The pickup data D6A–D6D are selectively switched by the switch circuit 35 in accordance with the majority-decided shift value signal SFT in such a manner as to conform with the channels corresponding to the magnetic heads in the recording mode and then are fed respectively to the channel data processing circuits 36A–36D, where the switched data are processed in accordance with both the segment identifying signal SOUT and the field identifying signal FOUT and then are outputted as the data of the same channels as those in the recording mode.

Upon increase of the shift value to "3" with further progress of the scanning executed by the magnetic heads 17A–17D, the same operation as the above is performed to determine the majority shift value signal SFT, the segment identifying signal SOUT and the field identifying signal FOUT, thereby controlling the switch circuit 35 and the channel data processor 36.

Thus, according to the above-mentioned embodiment where the shift value is computed on the basis of the pickup data D6A–D6D obtained from the entire channels, a remarkably accurate shift value can be ensured in comparison with the conventional case of calculating the shift value from the data of merely one channel.

Furthermore, taking notice of the fact that the patterns of the segment identifying signals SEGA–SEGD and the field identifying signals FILA–FILD are limited upon determination of the shift value, this embodiment is so contrived that the segment identifying signals SEGA–SEGD and the field identifying signals FILA–FILD actually obtained are judged to be approximate to one of the patterns and are thereby determined selectively, so that it becomes possible to ensure remarkably accurate segment and field identifying signals.

Since the shift value, segment identifying signals and field identifying signals can thus be obtained with accuracy, satisfactory picture reproduction is achievable by the digital VTR even in a varied-speed reproduction mode as well as in a normal reproduction mode.

The pattern of field identifying signals may be determined on the basis of the shift value and the input field identifying signals, but the number of patterns for selection becomes four in this case. In comparison therewith, such patterns can be reduced to two by using the information of selected segment identifying signal SOUT, hence realizing more accurate determination of the field identifying signal FOUT.

Generally when determining a plurality of identifying signals, first the content (pattern) of a shorter-period signal is determined and then that of a next short-period signal is determined on the basis of the preceding signal, so that the number of patterns for selection is reducible at the time of determination to consequently ensure high accuracy.

The above embodiment is concerned with an exemplary case of applying the present invention to a digital VTR where four tracks are recorded with one rotation of a drum by the use of four heads and unit video data of one field is recorded with two rotations of the drum. It is to be understood, however, that the present invention is not limited to the afore-mentioned embodiment alone and is widely applicable to any digital tape player of the type that reproduces one unit of signal in a plurality of tracks.

Furthermore, the identifying signal processed in the interchanger for determination of the content is not limited to a segment or field identifying signal alone and may be a signal relative to a frame or color frame as well.

As described hereinabove, according to the present invention wherein a shift value is decided by the use of pickup data of the entire channels and the pattern of identifying signals is determined on the basis of such shift value, an improved digital tape player can be accomplished with facility as it becomes possible to obtain the shift value and the identifying signals with accuracy even if the pickup data are partially inaccurate, and picture reproduction is rendered remarkably exact by processing the data in accordance with such shift value and identifying signals.

Furthermore, by comparing the identifying signals SIN derived from the pickup data D6A–D6D with the relevant patterns, an accurate identifying signal SOUT is obtainable even if the identifying signals SIN derived from the pickup data D6A–D6D are inaccurate and the combination thereof cannot essentially be existent.

What is claimed is:

1. Apparatus for reproducing digital data one unit of which is divided into a plurality of channels, supplemented with at least one kind of identifying data and recorded on a plurality of tracks of a tape recording medium, the apparatus comprising:
   a plurality of reproducing heads corresponding to said tracks for reproducing digital data from the recording medium;
   means for detecting said identifying data on respective reproduced tracks;
   means for reproducing respective spatial relationships between said reproducing heads and the tracks reproduced by said reproducing heads in said respective channels;
   means for determining an optimum relationship from said spatial relationships; and
   means for determining further identifying data based on said identifying data and said optimum relationship and for supplying said further identifying data to said respective channels.

2. Apparatus according to claim 1, wherein said means for detecting an optimum relationship selects one of said spatial relationships as said optimum relationship by majority logic.

3. Apparatus according to claim 1, wherein said means for determining further identifying data comprises means for storing a plurality of possible patterns of said identifying data for respective channels, comparing said possible patterns to a pattern formed by said identifying data, and selecting as said further identifying data one of said possible patterns which is closest to said pattern formed by said identifying data.

* * * * *